(12) United States Patent
Mueller et al.

(10) Patent No.: US 12,194,854 B2
(45) Date of Patent: Jan. 14, 2025

(54) DEVICE FOR STORING AT LEAST ONE COMPONENT IN A VEHICLE AND VEHICLE OR VEHICLE ELEMENT COMPRISING THIS DEVICE

(71) Applicant: Vibracoustic SE, Darmstadt (DE)

(72) Inventors: Niklas Mueller, Ihringen (DE); Tim Fricker, Breisach am Rhein (DE)

(73) Assignee: Vibracoustic SE, Darmstadt (DE)

( * ) Notice: Subject to any disclaimer, the term of this patent is extended or adjusted under 35 U.S.C. 154(b) by 478 days.

(21) Appl. No.: 17/549,220

(22) Filed: Dec. 13, 2021

(65) Prior Publication Data

US 2022/0194203 A1      Jun. 23, 2022

(30) Foreign Application Priority Data

Dec. 21, 2020   (DE) .......................... 102020134377.9

(51) Int. Cl.
*B60K 5/12*         (2006.01)
*F16F 1/387*        (2006.01)

(52) U.S. Cl.
CPC ............ *B60K 5/1208* (2013.01); *F16F 1/387* (2013.01)

(58) Field of Classification Search
CPC ................................ F16F 1/387; B60K 5/1208
See application file for complete search history.

(56) References Cited

U.S. PATENT DOCUMENTS

| | | | |
|---|---|---|---|
| 7,914,023 B2 * | 3/2011 | Zaloga | B62D 7/08 403/228 |
| 9,709,123 B2 | 7/2017 | Kim | |
| 10,145,442 B2 | 12/2018 | Ditzel et al. | |
| 10,406,975 B2 | 9/2019 | Obayashi | |

(Continued)

FOREIGN PATENT DOCUMENTS

| | | | |
|---|---|---|---|
| CN | 106122358 A | 11/2016 | |
| CN | 106536322 A | 3/2017 | |

(Continued)

OTHER PUBLICATIONS

German Office Action, 10 2020 134 377.9, dated Sep. 7, 2021, with Google Translate.

(Continued)

*Primary Examiner* — Melanie Torres Williams
(74) *Attorney, Agent, or Firm* — Fishman Stewart PLLC (57) ABSTRACT

A device for supporting a component in a vehicle including a support part having a first end portion, a second end portion, and a retaining part at the second end portion for connection to a damping element; a bearing mounting for receiving the component, which has a connection area for connection to a stop element and is arranged a distance from the support part in a radial direction with respect to the longitudinal axis a stop element arranged in the radial direction between the load receptacle and support part, fixed to the connecting portion and comprising a stop surface facing the support part; and a damping element for damping vibrations, fixed to the stop element and support part. In (Continued)

embodiments, the stop element is supported by the damping element movably with respect to the support part in the radial direction and an axial direction with respect to the longitudinal axis.

20 Claims, 6 Drawing Sheets

(56) References Cited

U.S. PATENT DOCUMENTS

| | | | |
|---|---|---|---|
| 2009/0218739 A1* | 9/2009 | Terada | B60R 21/2037 267/136 |
| 2010/0124455 A1* | 5/2010 | Zaloga | F16C 11/02 403/120 |
| 2012/0043708 A1 | 2/2012 | Burlage et al. | |
| 2017/0097040 A1 | 4/2017 | Schultz | |
| 2017/0144594 A1 | 5/2017 | Obayashi | |
| 2019/0061512 A1 | 2/2019 | Noguez et al. | |
| 2020/0217362 A1 | 7/2020 | Durre et al. | |

FOREIGN PATENT DOCUMENTS

| | | |
|---|---|---|
| CN | 107061602 A | 8/2017 |
| DE | 10261756 A1 | 7/2004 |
| DE | 102010039621 A1 | 2/2012 |
| DE | 102010037726 A1 | 3/2012 |
| DE | 102012018319 A1 | 4/2013 |
| DE | 102015116799 A1 | 4/2017 |
| DE | 102016001507 A1 | 8/2017 |
| DE | 102016117315 A1 | 3/2018 |
| DE | 102017126156 B3 | 1/2019 |
| DE | 102018116770 A1 | 1/2020 |
| DE | 102018131998 A1 | 6/2020 |
| EP | 1211106 A2 | 6/2002 |
| EP | 3708864 A1 | 9/2020 |
| JP | H4-110247 U | 9/1992 |
| JP | H04110247 U | 9/1992 |
| JP | H8-121528 A | 5/1996 |
| WO | 2006119891 A1 | 11/2006 |
| WO | 19/202217 A1 | 10/2019 |

OTHER PUBLICATIONS

European Search Report, EP 21201528.3, dated Apr. 14, 2022.
Chinese Office Action and Search Report, CN202111374684.8, dated May 31, 2024 (w_translation).
Chinese Search Report, CN202111374684.8, dated Oct. 15, 2024 (w_machine_translation).

* cited by examiner

DEVICE FOR STORING AT LEAST ONE COMPONENT IN A VEHICLE AND VEHICLE OR VEHICLE ELEMENT COMPRISING THIS DEVICE

CROSS-REFERENCE TO RELATED APPLICATIONS

This application claims priority to German Patent Application No. DE 10 2020 134 377.9, filed Dec. 21, 2020, the contents of which are hereby incorporated by reference in its entirety.

TECHNICAL FIELD

The invention concerns a device for storing at least one component in a vehicle, and a vehicle or vehicle element comprising such a device.

BACKGROUND

In vehicles, components with bearing supports can be mounted to a vehicle or vehicle part. If these components can cause vibrations during operation, either due to an external force or due to their operation, the bearing supports are connected to the vehicles in such a way that the components are decoupled from the vehicle in terms of vibration. Effective decoupling of high-frequency vibrations is achieved if low-damping elements are used.

A bearing device is known from DE 10 2017 126 156 B3, which is designed for oscillatory mounting and decouples vibrations between a component and a vehicle element. A spiral spring is arranged between the component and the vehicle element, which decouples vibrations between the component and the vehicle. The component is supported on the spiral spring on the vehicle. The coil spring is connected to the vehicle and transmits loads via a sliding element in the form of a sleeve to an elastomer element connected to the component. Typically, the coil spring is made of steel.

Matching radial to axial stiffness of steel springs can be challenging, and low-damping steel springs tend to develop self-modes under high-frequency stimulation, producing stiffness peaks. Therefore, there is a need for simplification of decoupling.

When elastomer springs are used instead of steel springs, an additional sleeve is usually required for the safe transmission of loads. The connection between the elastomer spring and the additional spring is usually made via a material bond. However, this requires complex production.

It is therefore an object of the invention to provide a device for storing at least one component in a vehicle which is simple to manufacture and inexpensive.

SUMMARY

Various features of the invention and embodiments of such are disclosed herein.

In a first aspect of the invention, there is provided a device for supporting at least one component in a vehicle, comprising: at least one support part for supporting the device on the vehicle or a vehicle element, the support part having a first end portion and a second end portion opposite the first end portion along a longitudinal axis of the support part, the support part having a retaining portion at the second end portion for connection to a damping element; at least one bearing receptacle for receiving the component, the bearing receptacle having a coupling portion for connection to a stop element and being arranged spaced from the support part in a radial direction with respect to the longitudinal axis; at least one stop element arranged in the radial direction between the bearing receptacle and the support part, fixed to the connecting portion and comprising a stop surface facing the support part; and at least one damping element for damping vibrations, fixed to the stop element and the support part; wherein the stop element is supported by means of the damping element movably with respect to the longitudinal axis in the radial direction and an axial direction relative to the support part.

In accordance with the invention, a device is thus provided for mounting at least one component in a vehicle, in which the damping element merely effects the decoupling between the component and the vehicle and the stop element establishes the connection between the bearing mount and the damping element. The functions of damping and secure connection of the damping element to the bearing mount are thus divided between two different elements. The damping element is connected to a support part which supports the device on a vehicle or vehicle element. A first end piece of the support part is connected to the vehicle or vehicle element and a second end piece of the support part opposite the first end piece is connected to the damping element. The damping element is connected via a stop element to a bearing mount for receiving the component. The stop element is thereby supported by means of the damping element so as to be movable relative to the support part in a radial direction and in an axial direction with respect to a longitudinal axis of the support part extending between the first and second end pieces. That is, the stop element can oscillate with the bearing support in an axial direction and in a radial direction with respect to the longitudinal axis. In this case, the stop element is arranged in the radial direction between the bearing receptacle and the support part and comprises a stop surface facing the support part. Therefore, when the component with the bearing mount and the stop element contacts the support part in the radial direction during vibration, the stop surface of the stop element strikes the support part. The forces resulting from the impact are absorbed by the stop element. Preferably, the stiffness of the damping element is low so that high-frequency vibrations of the component, especially in the axial direction, are completely or almost completely damped by the damping element. A device for mounting at least one component in a vehicle is thus provided which is simple to manufacture and inexpensive.

The stopping element thus causes a stop in any radial direction to the longitudinal axis between the support part and the bearing holder. The stop element has sufficient clearance to initially perform a motion in the radial direction without a stop on the support part. This protects the bearing mount and the damping element from damage caused by strong vibrations or impacts.

According to one example, the damping element may be formed as an elastomeric molded part.

Elastomer moldings are simple and inexpensive to manufacture. Furthermore, the axial and radial stiffness of elastomer moldings can be adjusted much more easily than with steel springs. In particular, axial vibrations can be almost completely damped by elastomer moldings with low axial stiffness.

It is further possible that the connection area may comprise a wall element, wherein the damping element is at least partially arranged, preferably clamped, between the stop element and the wall element.

By arranging the damping element between the wall element and the stop element, the damping element can be securely mounted on the device. This also provides protection against overload. In particular, if the damping element is clamped between the wall element and the stop element, a more reliable assembly is possible. The stop element thus not only provides the connection between the damping element and the bearing mount, but also fixes the damping element to the bearing mount. For example, the wall element can extend parallel to the longitudinal axis or be arranged conically or in a similar manner to the longitudinal axis.

Furthermore, the wall element can extend around the longitudinal axis, for example. The wall element can thus be annular and extend around the stop element and the damping element arranged between the stop element and the wall element.

According to another example, it is conceivable that the stop element may be arranged between the retaining part and the first end piece, wherein the damping element at the retaining part extends away from the stop element and thereafter at least partially in an arc towards the stop element.

The damping element can thus have one or more bands, for example, or be manufactured as a tubular part, with one part of each band being bent over or one part of the tubular part being folded inwards. One end of the tubular part is then attached to the support part, the other to the stop element. The stop element can thus be attached to the damping element on the support part while hanging. In this way, the damping element can absorb axial and radial vibrations of the stop element or the bearing mount fixed to it with the component particularly effectively.

Further, the stop element may have, for example, a first passage opening through which the support part extends and on which the stop surface is arranged.

The stop element then extends around the longitudinal axis and thus also around the support part. The stop element can thus be annular, for example. At the same time, for example, the bearing mount can also extend around the longitudinal axis and the support part. The same applies to the damping element. The device thus has a simple structure.

For example, the damping element may include a second passage opening, the second passage opening being arranged at least partially overlapping with the first passage opening, and the support part extending through the first passage opening and the second passage opening.

By overlapping the first passage opening with the second passage opening, the support part can be passed through both passage openings. The support part is then attached to the second passage opening, so that the damping element creates a connection between the stop element and the support part between the first passage opening and the second passage opening.

According to another example, the stop surface may have at least one rib element directed in a radial direction towards the support part.

Furthermore, the stop element can have a plurality of rib elements that can form a crown contour on the stop element. The use of at least one ribbed element can reduce the noise generated by a stop. Further, a punctual stop is provided at the stop surface. The point of impact of the support part on the stop surface can thus be controlled and predefined by the at least one rib element, at least at the position of the rib element.

According to another example, the rib element may include a first flattened end portion and a second flattened end portion and extend parallel to the longitudinal axis between the first flattened end region and second flattened end region.

The rib element is thus bulbous. At the two flattened end regions, the rib element projects less in the direction of the support part than between the two flattened end regions. This creates additional clearance at the end regions, which reduces the number of stops of the stop element against the support part in the event of a wobbling motion of the damping element or the stop element of the bearing mount.

Further, the rib element may extend at least partially in the direction of the longitudinal axis. In another example, at least one rib element may be arranged transverse to the longitudinal axis. In this case, the rib element may extend around the longitudinal axis and be ring-shaped.

The support part can be designed, for example, as a sleeve which extends along the longitudinal axis and through which a fastening element can be passed for connection to the vehicle or vehicle element.

The fastening element can be designed, for example, as a screw that can be screwed into the vehicle or the vehicle element. The support part is then fastened to the vehicle or vehicle element by the fastening element.

In another example, the sleeve may have an internal thread through which a screw is screwed from the underside as a fastening element.

In this example, the vehicle or vehicle element only has a passage opening through which the fastening element is passed in order to be connected to the support part on the other side. The connection is made by screw-fastening the fastening element into the support part.

According to another example, the support part may be formed as a bolt that is connectable to the vehicle or vehicle element.

In this example, the support part may have a threaded portion at an end portion that is threaded through a suitable opening on the vehicle or vehicle element and that may be bolted in place by means of a locknut.

Alternatively or additionally, the support part in this example can be screwed directly into an opening with an internal thread of the vehicle or vehicle element.

It is also possible for the damping element to be connected to the retaining part in a form-fit, force-fit and/or material-fit manner.

The damping element can preferably be non-detachable connected to the support part. In the case of a form-fit connection, the damping element can, for example, have a groove that is placed over a flange of the support part. In the case of a material-fit connection, the damping element can be connected to the support part, for example, by bonding or vulcanization. A force-locking connection can be produced, for example, by clamping between the support part and the damping element.

It is also possible for the retaining part and/or the damping element to have at least one form-fit opening for producing a form-fit connection between the retaining part and the damping element.

If, for example, the damping element has a form-fit opening, a pin of the retaining part can be inserted into the form-fit opening and in this way produce a form-fit transverse to the form-fit opening. This is a simple way of ensuring secure mounting of the damping element on the retaining part.

According to another example, the retaining part may be designed as a washer and the supporting part as a bushing and/or sleeve.

In this case, the damping element can first be connected to the washer and then connected to the sleeve or bushing of the support part. Further, in this example, the support part can have a bushing or sleeve on the vehicle or vehicle element. Thus, the washer of the support part need only be connected to the bushing or sleeve to effect attachment to the vehicle. This also simplifies assembly.

Furthermore, the retaining part can be integrated into the supporting part.

In this example, the retaining part can be designed as a flange on the support part.

The support part may further include an elastomeric layer disposed between the support part and the stop element.

In this way, a smooth connection between the stop element and the support part can be achieved, which further reduces noise and dampens the impact of the stop element.

In another aspect, the invention relates to a vehicle or vehicle element comprising a device according to the preceding description, wherein the support part is arranged with the first end piece on the vehicle or vehicle element.

Advantages and effects as well as further developments of the vehicle or vehicle element result from the advantages and effects as well as further developments of the device described above. Reference is therefore made in this respect to the preceding description.

The support part may be formed on the vehicle or vehicle element.

BRIEF DESCRIPTION OF THE DRAWINGS

Further features, details and advantages of the invention are apparent from the wording of the claims and from the following description of embodiments based on the drawings. As shown:

DETAILED DESCRIPTION

In the following, the device for storing a component vehicle will be referred to by the reference number 10.

Figure 1A:
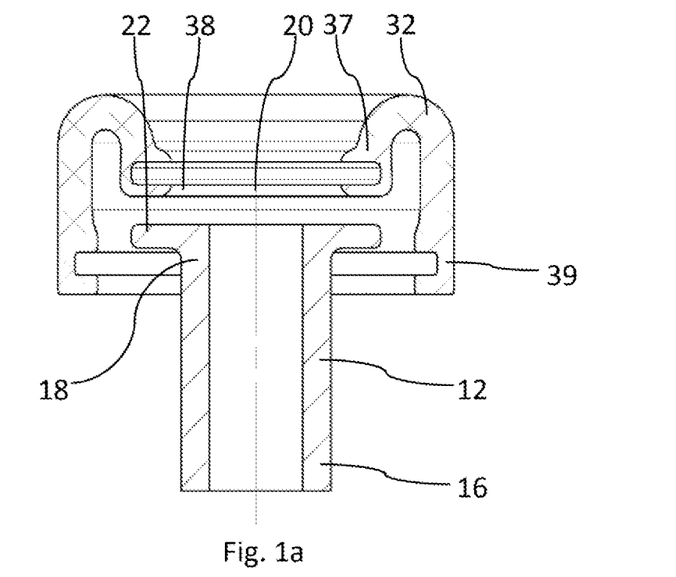
FIGS. 1a-g generally illustrate sectional views of components of a device.

Referring to FIGS. 1a to 1g, the device 10 includes a support part 12, a damping element 32, a stop element 28, and a bearing mount 24. In FIG. 1a, the support part 12 and the damping element 32 are shown.

The support part 12 comprises a first end piece 16 and a second end piece 18, which is opposite the first end piece 16. Further, the support part 12 is formed as a sleeve. The support part 12 extends along a longitudinal axis 20. An opening of the sleeve 20 also extends along the longitudinal axis 20.

A retaining part 22 is arranged on the second end piece 18, which is designed as a flange.

The damping element 32 is formed as an elastomeric molded part. It includes a through opening 38 that also extends about the longitudinal axis 20 when the damping element 32 is connected to the support part 12. The damping element 32 further includes a groove extending along the edge of the through opening 38. The groove is configured to receive the flange of the retaining part 22.

Further, the damping element 32 has a shape whose cross-section has a U-shaped arc. The passage opening 38 of the damping element 32 is arranged on one leg 37 of the U-shaped arc, the other leg 39 of the U-shaped arc of the damping element 32 is designed for connection to the stop element 28.

In FIG. 1a, the damping element 32 and the support part 12 are still shown in a separate state.

Figure 1B:
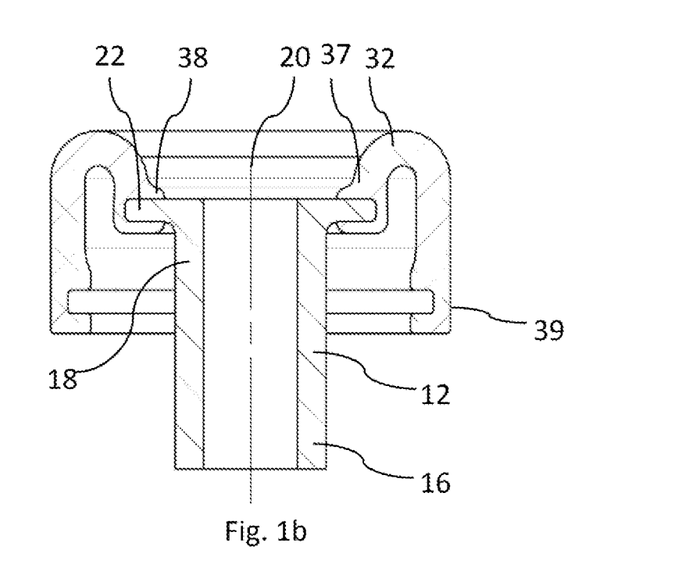

In FIG. 1b, the damping element 32 is connected to the support part 12. The passage opening 38 is fastened to the retaining part 22 by means of the groove. A form-fit connection is produced.

Figure 1C:
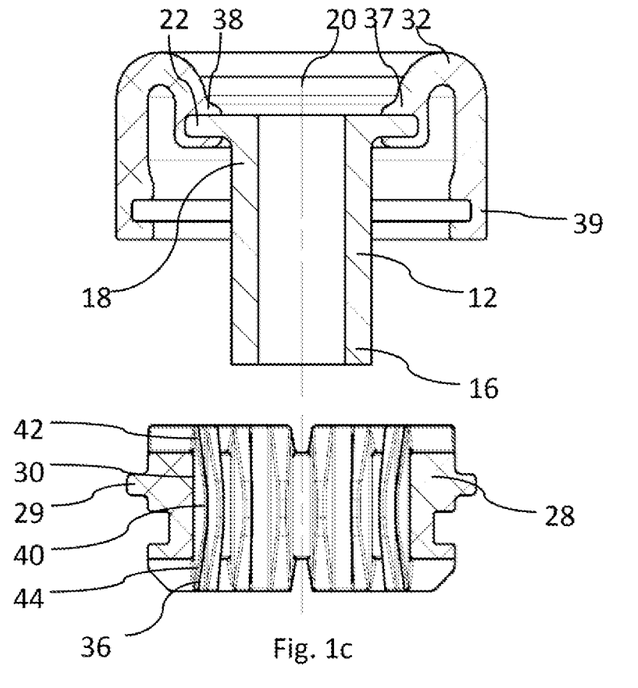

In FIG. 1c, the stop element 28 is shown in addition to the connected component of FIG. 1b. In this example, the stop element 28 is annular around the longitudinal axis 20 when the stop element 28 is connected to the damping element 32.

The stop element 28 includes a passage opening 36. In the following, the passage opening 36 is referred to as the first passage opening and the passage opening 38 is referred to as the second passage opening. A stop surface 30 is arranged at the first passage opening 36, which limits the stop element 28 relative to the first passage opening 36. At least one rib element 40 is arranged on the stop surface 30, which extends in a radial direction with respect to the longitudinal axis 20 into the first passage opening 36.

In this example, the stop element 28 includes a plurality of rib elements 40. The plurality of rib elements 40 form a crown shape on the stop element 28.

In this example, the rib elements 40 all extend parallel to the longitudinal axis 20. At least one rib element 40 has a first flattened end region 42 and a second flattened end region 44, between which the rib element 40 extends. The flattening is to be understood in a radial direction, so that the rib element 40 projects deeper into the first passage opening 38 between the two flattened end regions 42, 44 than at the two flattened end regions 42, 44.

In an alternative example not shown, the rib elements 40 may extend about the longitudinal axis.

Further, the stop element 28 comprises a flange 29 which is formed as a tongue for a groove arranged on the leg 39 of the damping element 32. Via the groove on the leg 39, the damping element 32 can be connected to the flange 29 of the stop element 28. This is shown in FIG. 1d.

The connection between the stop element 28 and the damping element 32 can be made alternatively or in addition to this form-fit connection, materially or frictionally.

Figure 1D:
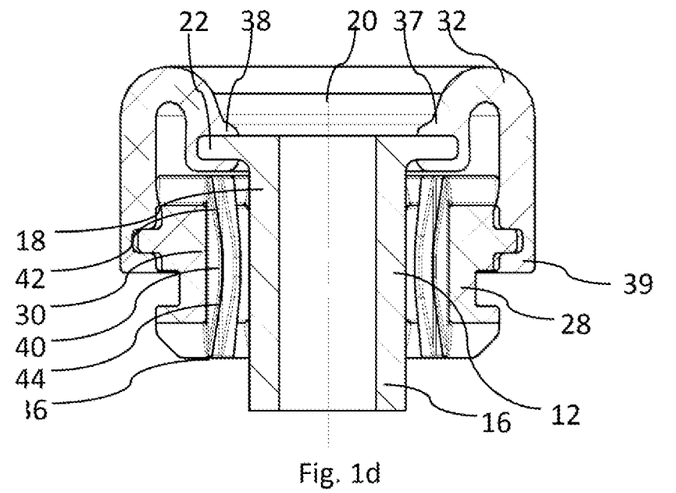
Figure 1E:
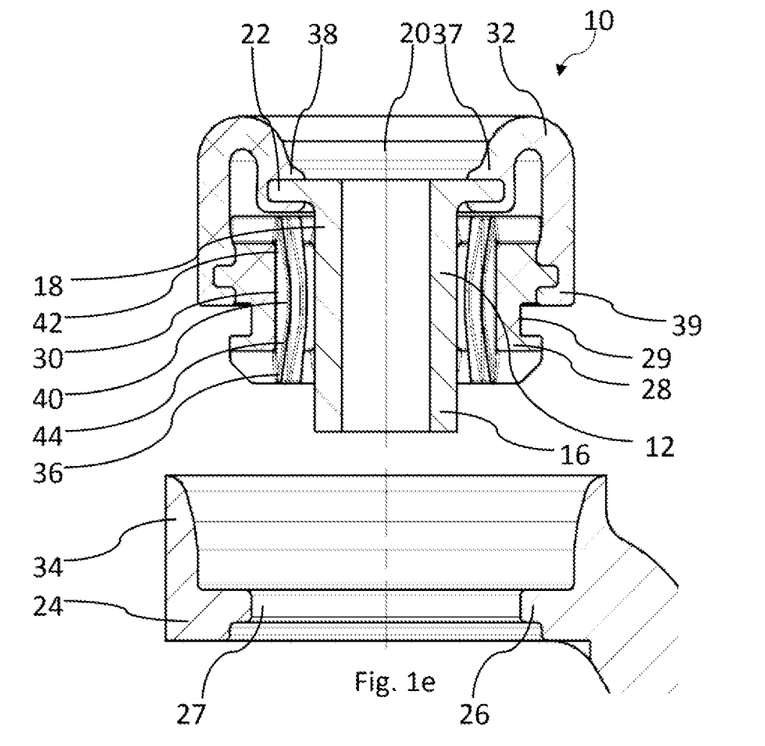

FIG. 1e shows a portion of the bearing retainer 24 in addition to the assembled components of FIG. 1d. The bearing mount 24 includes a connection area 26 that includes an opening 27 into which the assembled components of FIG. 1d can be inserted. In particular, the stop element 28 can be inserted into the connection area 26.

The connection region 26 further comprises a wall element 34 extending around the opening 27. Alternatively or additionally, the wall element 34 may extend only partially around the opening 27.

Figure 1F:
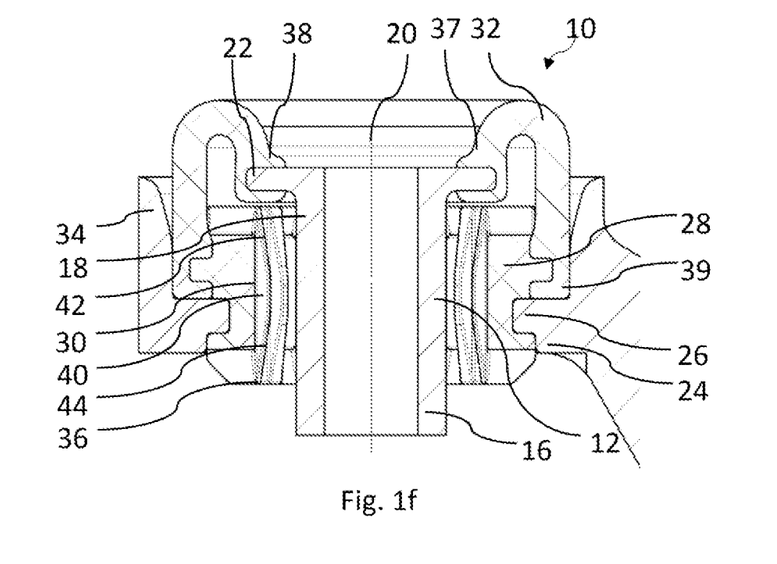

The stop element further comprises a groove 29, which is designed to receive an edge of the opening 27. In this way, a positive connection can be made between the stop element 28 and the connection area 26. This is shown in FIG. 1f.

The damping element 32 is arranged between the stop element 28 and the wall element 34. The stop element 38 presses the leg 39 of the damping element 32 against the wall element 34. In this way, a secure connection between the damping element 32 and the bearing holder 24 can be effected via the stop element 38.

The stop element 28 is thus suspended from the support part 12 via the leg 39 of the damping element 32. The stop element 28 can oscillate in the axial direction parallel to the longitudinal axis 20 and in the radial direction. In radial direction, a possible motion of the stop element 28 and thus of the bearing holder 24 is defined by the distance between the rib elements 40 and the support part 12. In a radial motion that bridges the distance, the rib elements 40 strike the support part 12. In the process, the stop element 28 absorbs the force acting on it so that the damping element 32, which is made of a soft material, is not damaged. To dampen the impact of the rib elements 40 on the support part 12, the support part 12 can have an elastomer layer 58.

In the axial direction, the upward motion of the stop element 28 is limited by the damping element 32 itself or the support part 12. In the downward direction, the motion of the stop element 28 is limited by the vehicle or vehicle element 14 when the device 10 is connected to the vehicle or vehicle element 14. This is shown in FIG. 1g.

Figure 1G:
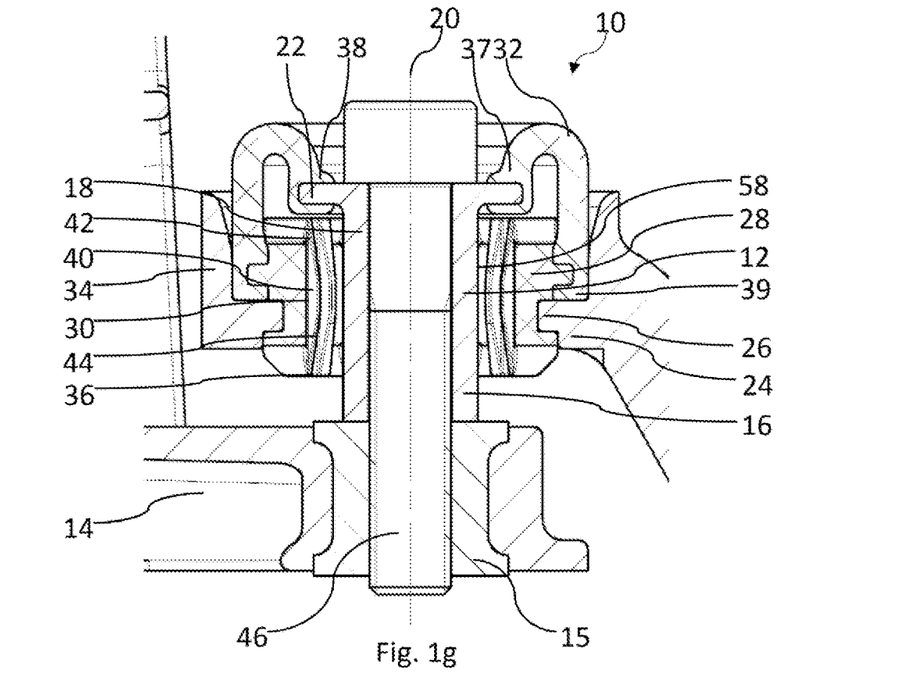

The assembled component from FIG. 1f is fastened to a vehicle part 14 in FIG. 1g by means of a fastening element 46. The fastening element 46 is shown here as a screw which is passed through the sleeve of the support part 12 and screwed into a threaded part 15 of the vehicle or vehicle part 14.

Figure 2A:
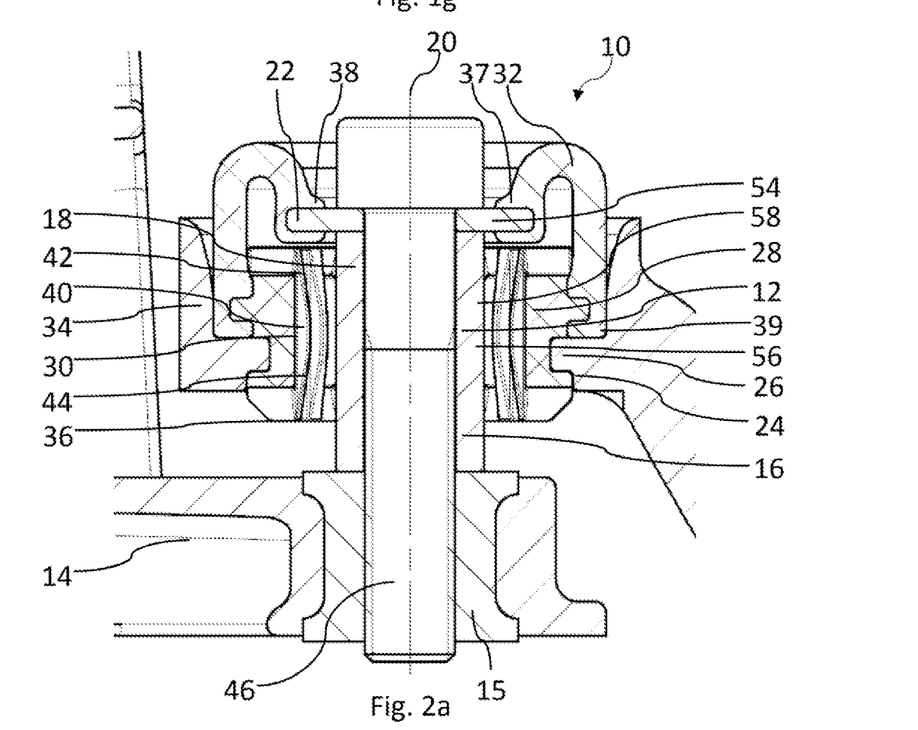
FIGS. 2a-e generally illustrate sectional views of various examples of a device.

FIG. 2a shows another embodiment of the support part 12. The support part 12 comprises a sleeve 56 and a disc 54, which are formed separately from each other. The disc 54 is initially connected to the damping element 32 as a retaining part 22. This can facilitate the mounting of the disc 54 to the damping element 32.

In this example, it is pressed against sleeve 56 by fastener 46, which is further pressed against vehicle part 14 by fastener 46.

Figure 2B:
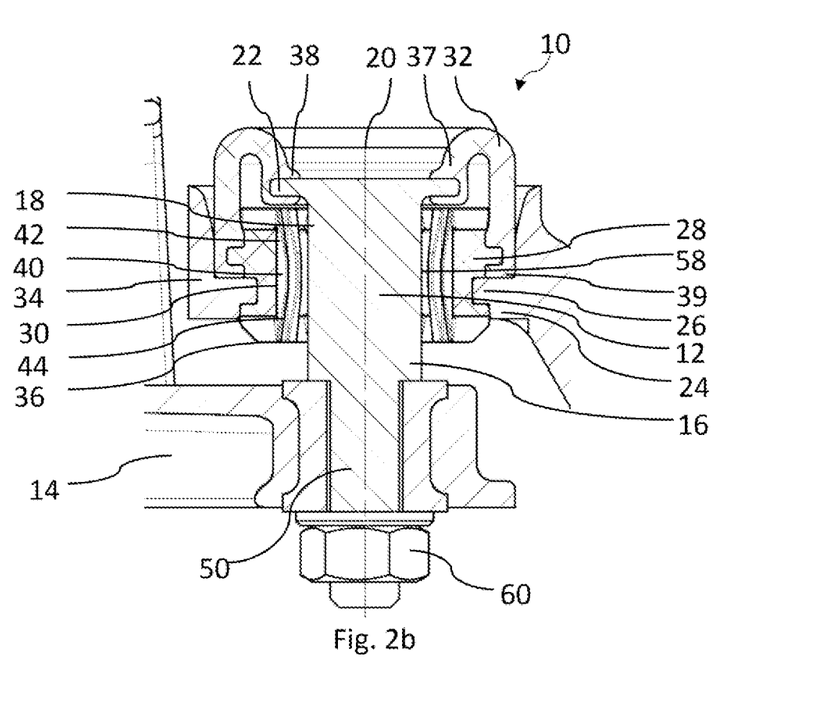

FIG. 2b shows another example of the support part 12. The support part 12 is designed as a bolt 50 with an external thread that can be inserted through an opening in the vehicle part 14. The bolt 50 is fastened by means of a nut 60 which is screwed onto the external thread.

Figure 2C:
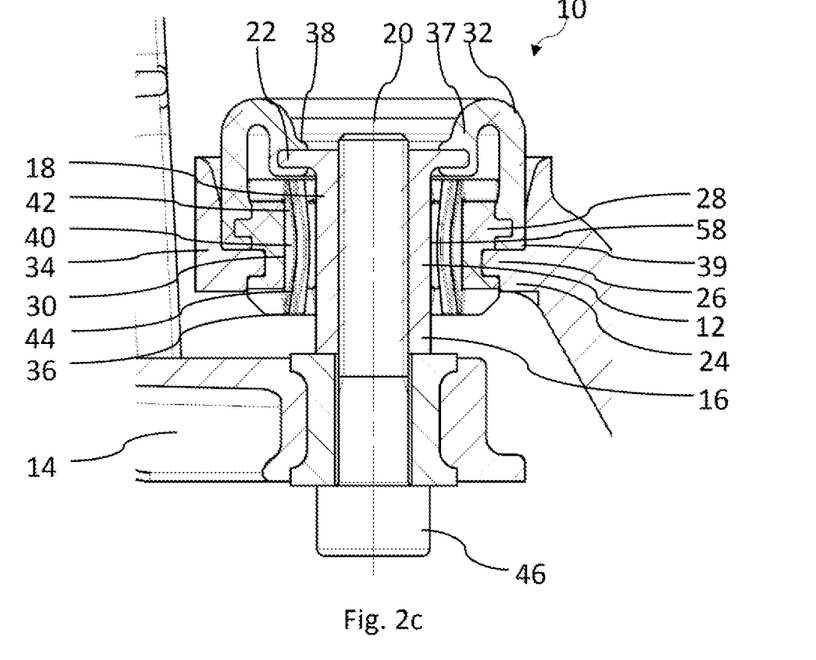

FIG. 2c shows another example of the support part 12. In this example, the support part 12 is provided with a through opening as in the embodiment according to FIGS. 1a to 1g. An internal thread is arranged at the through opening. In this example, the fastening element 46 extends from the side of the vehicle part 14 opposite the device 10 to the side on which the device 10 is arranged.

Figure 2D:
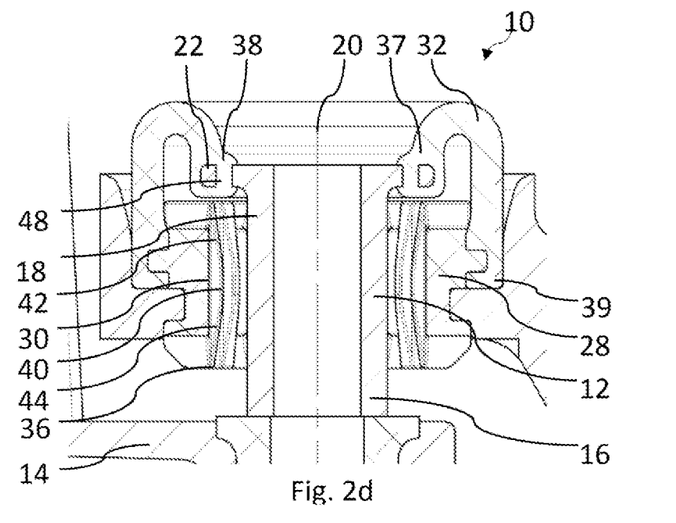

Another example of the support part 12 is shown in FIG. 2d. Here, the support part 12 is not yet connected to the vehicle element 14. The support part 12 has at least one form-fit opening 48 on the retaining part 22, in which a component of the damping element 32 engages in order to effect a form-fit connection.

Figure 2E:
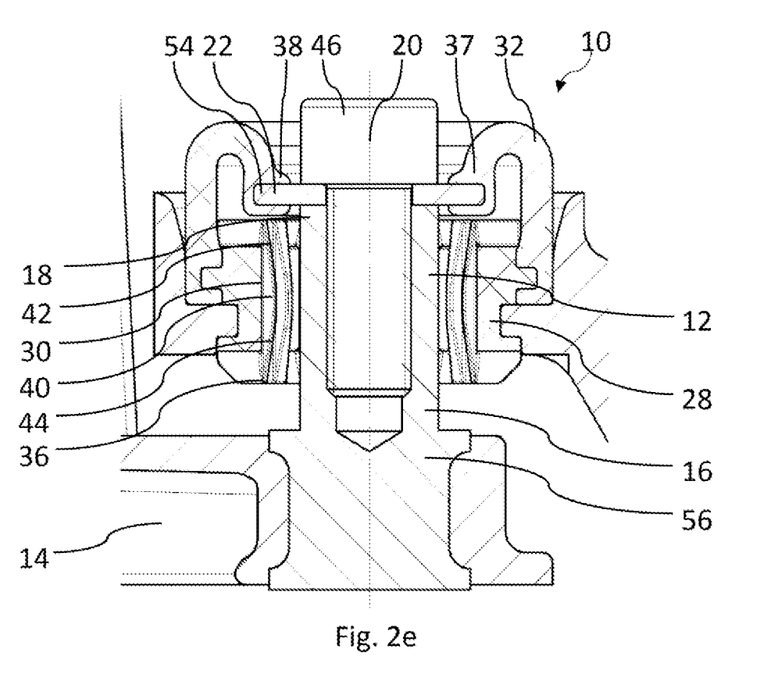

In FIG. 2e, the support part 12 is formed with a disc 54 as in the example in FIG. 2a. The sleeve 56 from FIG. 2a is formed here on the vehicle element 14 and is firmly connected to the vehicle element 14. The device 10 is assembled by first connecting the disc 54 to the damping element 32, the stop element 28 and the load receptacle 24. The disc is then placed on the sleeve 56, which is fixedly connected to the vehicle element 14, and can then be connected to the sleeve 46 by means of a fastening element or by other means, for example with a material connection.

The invention is not limited to one of the above-described embodiments, but can be varied in many ways. All features and advantages resulting from the claims, the description and the drawing, including constructional details, spatial arrangements and process steps, can be essential to the invention both individually and in the most varied combinations.

The invention claimed is:

1. A device for supporting a component in a vehicle, comprising:
   a support part for supporting the device on the vehicle or a vehicle element, the support part having a first end portion and a second end portion opposite the first end portion along a longitudinal axis of the support part, the support part having, at the second end portion, a retaining part for connection to a damping element;
   a bearing receptacle for receiving the component, which has a connection area for connection to a stop element and is arranged at a distance from the support part in a radial direction with respect to the longitudinal axis;
   a stop element arranged in the radial direction between the bearing receptacle and the support part, the stop element fixed to the connection area and comprising a stop surface facing the support part; and
   a damping element for damping vibrations, the damping element attached to the stop element and the retaining part;
   wherein the stop element is supported by the damping element movably with respect to the support part in the radial direction and an axial direction with respect to the longitudinal axis;
   wherein the connection area has a wall element, the damping element clamped at least partially between the stop element and the wall element.

2. The device according to claim 1, wherein the damping element is formed as an elastomer molded part.

3. The device according to claim 1, wherein the wall element extends around the longitudinal axis.

4. The device according to claim 1, wherein the stop element is arranged between the retaining part and the first end portion, the damping element on the retaining part extending away from the stop element and then at least partially in an arc towards the stop element.

5. The device according to claim 1, wherein the stop element has a first passage opening through which the support part extends and on which the stop surface is arranged.

6. The device according to claim 5, wherein said damping element having a second passage opening, said second passage opening being arranged at least partially overlapping with said first passage opening, and said support part extending through said first passage opening and said second passage opening.

7. The device according to claim 1, wherein the support part is formed as a sleeve which extends along the longitudinal axis and through which a fastening element can be passed for connection to the vehicle or vehicle element.

8. The device according to claim 1, wherein the support part comprises a bolt configured for connection to the vehicle or vehicle element.

9. The device according to claim 1, wherein the damping element is connected to the retaining part in a form-fitting and/or force-fitting and/or material-fitting manner.

10. The device according to claim 1, wherein the retaining part and/or the damping element has a positive-locking opening for producing a form-fitting connection between the retaining part and the damping element.

11. The device according to claim 1, wherein the retaining part is a disk and the retaining part is designed as a bearing and/or sleeve.

12. The device according to claim 1, wherein the retaining part is integrated into the supporting part.

13. The device according to claim 1, wherein the support part comprises an elastomer layer arranged between the support part and the stop element.

14. A vehicle or vehicle element, comprising a device according to claim 1, wherein the support part is arranged with the first end portion on the vehicle or vehicle element.

15. The vehicle or vehicle element according to claim 14, wherein the support part is formed on the vehicle or vehicle element.

16. The device according to claim 1, wherein the stop surface has a rib element which is directed in the radial direction towards the support part.

17. A device for supporting a component in a vehicle, comprising:
- a support part for supporting the device on the vehicle or a vehicle element, the support part having a first end portion and a second end portion opposite the first end portion along a longitudinal axis of the support part, the support part having, at the second end portion, a retaining part for connection to a damping element;
- a bearing receptacle for receiving the component, which has a connection area for connection to a stop element and is arranged at a distance from the support part in a radial direction with respect to the longitudinal axis;
- a stop element arranged in the radial direction between the bearing receptacle and the support part, the stop element fixed to the connection area and comprising a stop surface facing the support part; and
- a damping element for damping vibrations, the damping element attached to the stop element and the retaining part;
- wherein the stop element is supported by the damping element movably with respect to the support part in the radial direction and an axial direction with respect to the longitudinal axis; and
- wherein the stop surface has a rib element which is directed in the radial direction towards the support part.

18. The device according to claim 17, wherein the connection area has a wall element, the damping element arranged at least partially between the stop element and the wall element.

19. The device according to claim 18, wherein the damping element is clamped.

20. The device according to claim 17, wherein the rib element comprises a first flattened end area and a second flattened end area and extends parallel to the longitudinal axis between the first flattened end area and second flattened end area.

\* \* \* \* \*